United States Patent
Alicherry (10) Patent No.: US 12,067,596 B2
(45) Date of Patent: Aug. 20, 2024

(54) COMPUTER IMPLEMENTED METHOD FOR PARTNER PIXELLING FOR USER IDENTIFICATION

(71) Applicant: Vizury Interactive Solutions Private Limited, Bangalore (IN)

(72) Inventor: Mansoor Alicherry, Bangalore (IN)

(73) Assignee: Vizury Interactive Solutions Private Limited, Bangalore (IN)

( * ) Notice: Subject to any disclaimer, the term of this patent is extended or adjusted under 35 U.S.C. 154(b) by 0 days.

(21) Appl. No.: 17/448,856

(22) Filed: Sep. 24, 2021

(65) Prior Publication Data

US 2022/0122127 A1     Apr. 21, 2022

Related U.S. Application Data

(63) Continuation of application No. 15/084,378, filed on Mar. 29, 2016, now abandoned.

(30) Foreign Application Priority Data

Dec. 30, 2015    (IN) .......................... 7090/CHE/2015

(51) Int. Cl.
*G06Q 30/0251* (2023.01)
*G06Q 30/0273* (2023.01)
*H04L 67/02* (2022.01)
*H04L 67/10* (2022.01)

(52) U.S. Cl.
CPC ..... *G06Q 30/0271* (2013.01); *G06Q 30/0273* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 11,023,921 B2 * | 6/2021 | Wang | G06Q 30/0275 |
| 2010/0293047 A1 | 11/2010 | Schwarz et al. | |
| 2012/0209717 A1 * | 8/2012 | Henry | G06Q 30/02 705/14.64 |

(Continued)

OTHER PUBLICATIONS

J. Vsvaidya, "Cookie Synching", available on Apr. 20, 2010, retrieved from https://www.admonsters.com/cookie-synching/, discloses the concept of cookie synching between publishers, ad networks, ad exchanges, demand side platforms, and data exchanges. (Year: 2010).*

*Primary Examiner* — Sam Refai
(74) *Attorney, Agent, or Firm* — Kolisch Hartwell, P.C.

(57) ABSTRACT

The embodiments herein provide a computer implemented method for partner pixelling for user identification. The method includes sending a unique identifier request message to an identity broker when a user is on an advertiser webpage. The method includes receiving a unique identifier of the user from the identifier entity broker; and sending a rule file to a publisher server, wherein the rule file comprises the unique identifier of the user for which at least one DSP is interested in displaying an advertisement. Further, when the user visits the publisher website, the publisher server uses the unique identifier, revived from the identity broker, to identify the user and the list of DSPs that are interested in displaying advisement to the user.

8 Claims, 8 Drawing Sheets

400

| Send a unique identifier request message to an identity broker when a user is on an advertiser webpage | — 402 |

| Receive a unique identifier of the user from the identity broker | — 404 |

| Send a rule file to a publisher server, wherein the rule file includes the unique identifier of the user for which at least one DSP is interested in displaying an advertisement | — 406 |

(56) References Cited

U.S. PATENT DOCUMENTS

| | | | |
|---|---|---|---|
| 2014/0237496 A1* | 8/2014 | Julian | G06Q 30/02 |
| | | | 725/13 |
| 2014/0257999 A1* | 9/2014 | Garcia-Martinez | ......................... |
| | | | G06Q 30/0275 |
| | | | 705/14.71 |
| 2014/0279045 A1* | 9/2014 | Shottan | G06Q 30/0269 |
| | | | 705/14.66 |
| 2014/0324447 A1* | 10/2014 | Dittus | G06Q 30/0269 |
| | | | 705/2 |
| 2015/0339734 A1* | 11/2015 | Wilson | G06Q 30/00 |
| | | | 705/14.73 |
| 2016/0180409 A1* | 6/2016 | Shah | G06Q 30/0277 |
| | | | 705/14.66 |
| 2017/0193559 A1 | 7/2017 | Alicherry | |
| 2017/0337589 A1* | 11/2017 | Yu | G06Q 30/0277 |

* cited by examiner

COMPUTER IMPLEMENTED METHOD FOR PARTNER PIXELLING FOR USER IDENTIFICATION

TECHNICAL FIELD

The embodiments herein generally relate to ad buying. More particularly relates to a mechanism for efficient publisher pixelling for buying an advertisement.

BACKGROUND

Electronic exchanges, including online auctions, have proliferated along with the Internet. These electronic exchanges aim to provide a high degree of trading efficiency by bringing together a large number of buyers and sellers. Such centralized exchanges are focused on directly matching the bids or offers of buyers and sellers, and do not recognize or account for pre-existing relationships or agreements with other exchanges or between parties to the transaction, such as between (i) buyers and sellers, (ii) intermediaries (e.g., brokers, which may be a buyer or seller), or (iii) buyers or sellers and intermediaries.

Figure 1A:
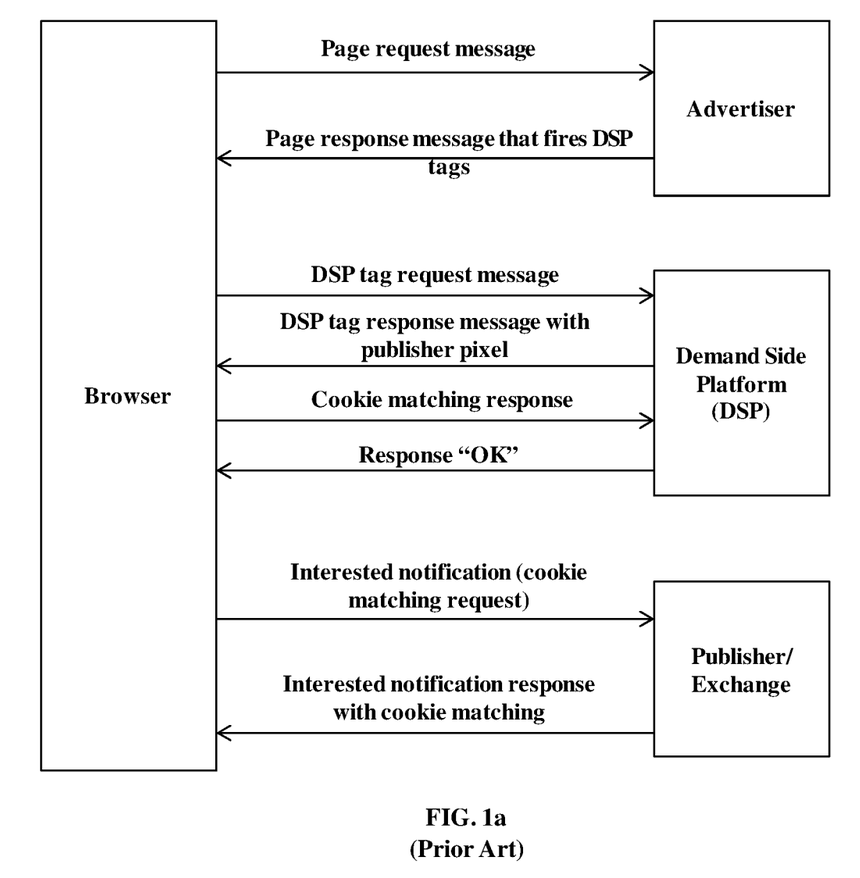
FIGS. 1a and 1b are schematic diagrams that show two types of conventional electronic exchange systems.

In conventional mechanisms as shown in FIG. 1a, when a user, using a personal computing device such as a desktop computer, laptop, tablet, or cell phone navigates to or "visits" the advertiser's webpage, In such an instance, an advertisement (Ad) tag request message may be generated and can be transmitted, directly or indirectly, by the browser to the Demand Side Platform (DSP). The DSPs in turn fires partner pixels for different publishers. Typically, DSP fires partner pixels of large number of publishers/exchanges when the user visits the advertiser page. The partner pixels are fired to inform the publishers that the DSP is interested in users and matching identifiers (IDs) of the DSP and the publisher (i.e., cookie matching) for the user for bidding.

Figure 1B:
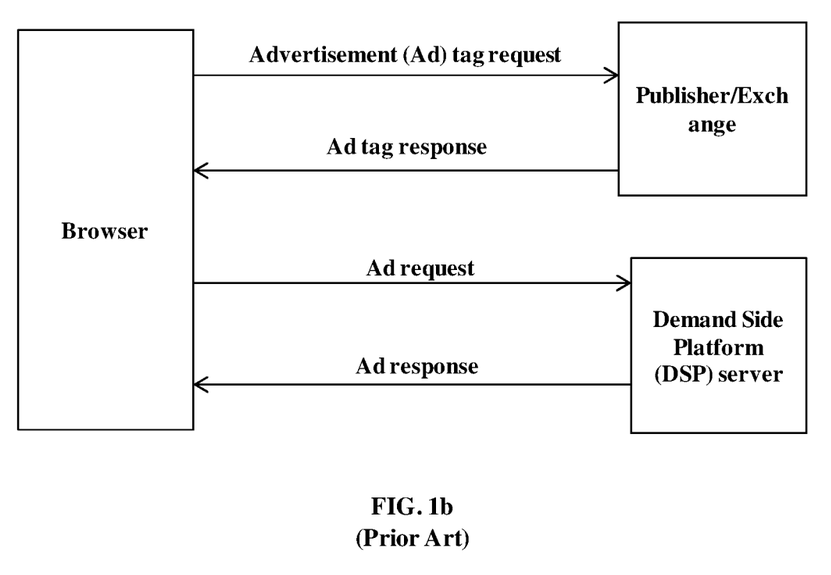

In conventional mechanisms as shown in FIG. 1b, the user, using the browser transmits the advertisement (Ad) tag request message to the publisher (or exchange). After receiving the Ad tag request message, the publisher or exchange transmits an Ad tag response message that fires DSP tags to the browser. The publisher transmits the Ad tag response message to the browser to redirect to the DSP server. The browser transmits the Ad request message to the DSP server. After receiving the Ad request message, the DSP server transmits the Ad response message to the browser. The above described method is the simplified view of displaying the Ad to the user by making use of a publisher specific identifier.

Further, a single user "X" will be known by different identifiers to different systems. For example, consider a scenario where the advertiser (adv.), 2 DSPs (i.e., DSP-1 and DSP-2), and 4 publishers (i.e., Pub-1, Pub-2, Pub-3, and Pub-4) are available in the current system. The user will be known to the entities described above by different names such as adv_X, DSP-1_X, DSP-2_X, Pub-1_X, Pub-2_X, Pub-3_X, and Pub-4_X. The DSPs need to store a mapping table including the user identifiers and the corresponding publisher's user identifiers. Instead of sending same identifier to all the DSPs, the publisher creates different identifiers for the same user to share with different DSPs. The mapping table stored in the DSP-1 is as shown below in Table-1:

TABLE 1

| DSP identifier | Publisher-1 identifier | Publisher-2 identifier | Publisher-3 identifier | Publisher-4 identifier |
| --- | --- | --- | --- | --- |
| DSP-1_X | F1(Pub1_X) | F2(Pub2_X) | F3(Pub3_X) | F4(Pub4_X) |

Further, the publishers need to store the mapping table of the user identifier to each of the DSP identifiers. The mapping table stored in the publisher-1 is as shown below in Table-2:

TABLE 2

| Publisher identifier | DSP-1 identifier | DSP-2 identifier |
| --- | --- | --- |
| Pub1_X | DSP-1_X | DSP-2_X |

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a mechanism for efficient publisher pixelling for buying an advertisement.

Another object of the embodiments herein is to provide a mechanism for sending a unique identifier request message to an identity broker when a user is on an advertiser webpage.

Another object of the embodiments herein is to provide a mechanism for receiving a unique identifier of the user from the identity broker.

Another object of the embodiments herein is to provide a mechanism for sending a rule file to a publisher server. The rule file includes the unique identifier of the user for which at least one DSP is interested in displaying an advertisement.

Yet another object of the embodiments herein is to provide a mechanism for sending the unique identifier request message to the identity broker when the user is on a publisher webpage.

Yet another object of the embodiments herein is to provide a mechanism for receiving the unique identifier of the user from the identity broker.

Yet another object of the embodiments herein is to provide a mechanism for identifying at least one Demand Side Platform (DSP) interested to display an advertisement to the user based on the unique identifier.

Yet another object of the embodiments herein is to provide a mechanism for receiving the unique identifier request message for the user from the DSP server or a publisher server.

Yet another object of the embodiments herein is to provide a mechanism for sending the unique identifier for the user to the DSP server or the publisher server, where the unique identifier for the user is generated based on at least one parameter.

Accordingly the embodiments herein provide a computer implemented method for partner pixelling for user identification. The method includes sending, by a Demand Side Platform (DSP) server, a unique identifier request message to an identity broker when a user is on an advertiser webpage. Further, the method includes receiving, by the DSP server, a unique identifier of the user from the identity broker. Further, the method includes sending, by the DSP server, a rule file to a publisher server, where the rule file includes the unique identifier of the user for which at least one DSP is interested in displaying an advertisement.

Accordingly the embodiments herein provide a computer implemented method for partner pixelling for user identification. The method includes sending, by a publisher server, a unique identifier request message to an identity broker when a user is on a publisher webpage. Further, the method includes receiving, by the publisher server, a unique identifier of the user from the identity broker. Further, the method includes identifying, by the publisher server, at least one Demand Side Platform (DSP) interested to display an advertisement to the user based on the unique identifier.

Accordingly the embodiments herein provide a computer implemented method for partner pixelling for user identification. The method includes receiving, by an identity broker, a unique identifier request message for a user from a Demand Side Platform (DSP) server or a publisher server. Further, the method includes sending, by the identity broker, the unique identifier for the user to the DSP server or the publisher server, where the unique identifier for the user is generated based on at least one parameter.

Accordingly the embodiments herein provide a Demand Side Platform (DSP) server for partner pixelling for user identification. The DSP is configured to send a unique identifier request message to an identity broker when a user is on an advertiser webpage. Further, the DSP is configured to receive a unique identifier of the user from the identifier entity broker. Further, the DSP is configured send a rule file to a publisher server, where the rule file includes the unique identifier of the user for which at least one DSP is interested in displaying an advertisement.

Accordingly the embodiments herein provide a publisher server for partner pixelling for user identification. The publisher server is configured to send a unique identifier request message to an identity broker when a user is on a publisher webpage. Further, the publisher server is configured to receive a unique identifier of the user from the identity broker. Further, the publisher server is configured to identify at least one Demand Side Platform (DSP) interested to display an advertisement to the user based on the unique identifier.

Accordingly the embodiments herein provide an identity broker for partner pixelling for user identification. The identity broker is configured to receive a unique identifier request message for a user from a Demand Side Platform (DSP) server or a publisher server. Further, the identity broker is configured to send the unique identifier for the user to the DSP server or the publisher server, where the unique identifier for the user is generated based on at least one parameter.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate understanding of ways in which the embodiments herein can be practiced and to further enable those skilled in the art to practice the embodiments herein. Accordingly, the examples should not be construed as limiting the scope of the embodiments herein.

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

Exchange: Exchange provides a platform for buying and selling advertising impressions by consolidating and managing impression opportunities across a plurality of publishers.

Demand Side Platforms (DSPs): It enables buyers to connect directly to multiple sources of inventory supply and provide benefits such as workflow simplification, integrated reporting, schematic buying optimization, and the ability to make impression-level bids (RTB).

Identity Broker: The task of identity broker is to provide a unique identifier to the browser or user whenever the identity broker is invoked from the context of the browser. The identity broker is expected to be neutral party which the publishers and DSPs trust in the service they provide. On a practical implementation side, it could be one of the large publishers with large reach, if they are willing to provide such neutral service.

The embodiments herein disclose a computer implemented method for partner pixelling for user identification. The method includes sending a unique identifier request message to an identity broker when a user is on an advertiser webpage. Further, the method includes receiving a unique identifier of the user from the identifier entity broker. Further, the method includes sending a rule file to a publisher server, where the rule file includes the unique identifier of the user for which at least one Demand Side Platform (DSP) is interested in displaying an advertisement.

In an embodiment, a DSP server calls an identifier entity broker service to send the unique identifier request message to the identity broker.

In an embodiment, the rule file defines a plurality of conditions based on which a DSP buys an advertising inventory to display advertisement to the user.

In an embodiment, the plurality of conditions are defined based on a DSP bid value, number of impressions, publisher website information, time of the day, a day of a year, type of inventory, a variable defined by an exchange, a variable defined by the at least one DSP, user behaviors on the advertiser webpage, or combination of same.

In an embodiment, the unique identifier is a random value generated by the identity broker, a fingerprint of a browser, a fingerprint of a user electronic device, and a cross identifier.

Another embodiment herein discloses a computer implemented method for partner pixelling for user identification. The method includes sending the unique identifier request message to the identity broker when the user is on the publisher webpage. Further, the method includes receiving the unique identifier of the user from the identity broker. Further, the method includes identifying the DSP(s) interested to display the advertisement to the user based on the unique identifier.

In an embodiment, identifying the DSP interested to display the advertisement to the user based on the unique identifier includes receiving the rule file from the DSP server, where the rule file includes unique identifier of the user for which the DSP is interested in displaying the advertisement. Further, the method includes determining a match between the unique identifier received from the identity broker; and the unique identifier in the rule file. Further, the method includes identifying the DSP interested to display the advertisement to the user in response to determining the match.

Another embodiment herein discloses a computer implemented method for partner pixelling for user identification. The method includes receiving the unique identifier request message for the user from the DSP server or the publisher server. Further, the method includes sending the unique identifier for the user to the DSP server or the publisher server, where the unique identifier for the user is generated based on at least one parameter.

In an embodiment, sending the unique identifier for the user to the DSP server or the publisher server includes determining whether the unique identifier is available in a database based on at least one parameter. Further, the method includes generating the unique identifier for the user based on the parameter when the unique identifier is unavailable in the database. Further, the method includes sending the unique identifier for the user to the DSP server or the publisher server.

In an embodiment, sending the unique identifier for the user to the DSP server or the publisher server includes determining whether the unique identifier is available in the database based on the parameter. Further, the method includes sending the unique identifier for the user to the DSP server or the publisher server when the unique identifier is unavailable in the database.

In an embodiment, the DSP server has the list of publishers/exchanges where the DSP server buys the inventory. Further, the DSP server and publishers/exchanges has a contract with the identity broker to access the services.

In the conventional systems and methods, due to multiple partner pixel firing, page load time and bandwidth consumption is increased. Also, the security of the advertiser page is reduced and forces the browser to visit sites/publisher URLs which the user does not intend to visit. The publishers can install cookies on the end users electronic devices.

Unlike conventional systems and methods, the proposed method provides a mechanism to generate a unique identifier of the user by the identity broker. In the proposed method, only one (or few in case of multiple identity brokers) identity broker pixel is fired. After generating the unique identifier, the identity broker transmits the unique identifier to the DSP server. Once the DSP server receives the unique identifier of the users that it is interested, the DSP server notifies the publisher server about the interest in an offline server to server procedure.

Referring now to the drawings, and more particularly to FIGS. 2 through 7, where similar reference characters denote corresponding features consistently throughout the figures, there are shown preferred embodiments.

Figure 2:
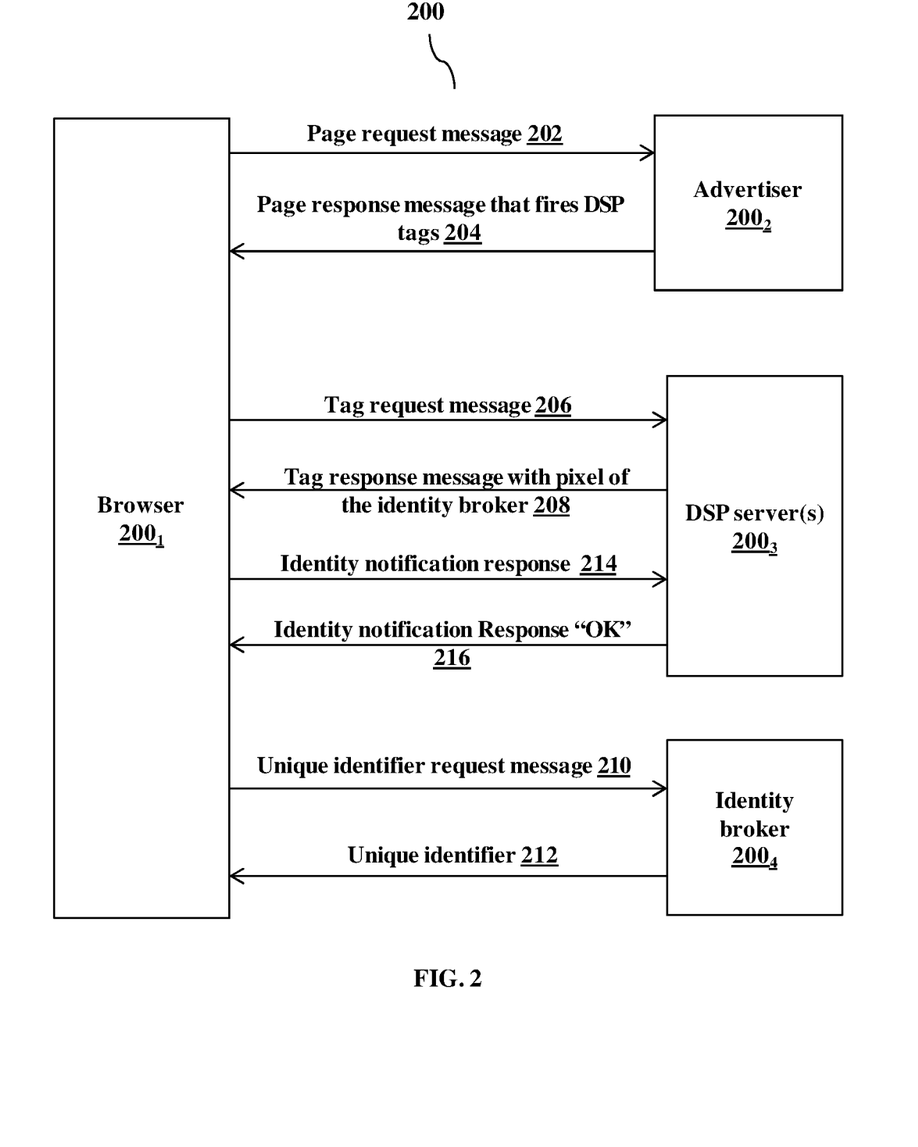
FIG. 2 illustrates a system for facilitating partner pixelling for user identification using a Demand Side Platform (DSP) server, according to an embodiment as disclosed herein.

FIG. 2 illustrates a system 200 for facilitating partner pixelling for user identification using a Demand Side Platform (DSP) server, according to an embodiment as disclosed herein. The bidding system 200 includes a browser 200$_1$, an advertiser 200$_2$, a DSP server(s) 200$_3$, and an identity broker 200$_4$. In an embodiment, there can be one or more identity brokers that give user identity service to the DSP server 200$_3$. As shown in the FIG. 2, interactions between the browser 200$_1$, the advertiser 200$_2$, the DSP server 200$_3$, and the identity broker 200$_4$ are described below:

Step 202: When a user, using the browser 200$_1$ in a personal computing device (not shown) such as a desktop computer, laptop, tablet, or cell phone transmits a page request message to the advertiser 200$_2$ when the user intends to visit a webpage of the advertiser 200$_2$. In an embodiment, the advertiser 200$_2$ inserts DSP tags in the web page.

Step 204: After receiving the page request message, the advertiser 200$_2$ transmits a page response message that fires DSP tags to the browser 200$_1$. In an embodiment, the advertiser 200$_2$ transmits the page response message to the browser 200$_1$ to redirect to the DSP server 200$_3$. For example, the advertiser 200$_2$ may return a Hyper Text Transfer Protocol (HTTP) redirect command when transmitting the page response message; the redirect command may identify a uniform resource locator (URL) associated with the DSP server 200$_3$.

Step 206: After receiving the redirect command, the browser 200$_1$ redirects to the DSP server 200$_3$ and transmits tag request message and user behavior information. In an embodiment, when the user navigates to the webpage of the advertiser 200$_2$, information pertaining to the user may be transmitted to the DSP server 200$_3$. For example, information collected by the user's web browser ("cookies") may be transmitted to the DSP server 200$_3$. Such information may include the user's web browsing history, the frequency with which the user visits particular webpage or type of web pages, or the user's online purchase history. In another embodiment, the user's computing device may transmit information indicative of user's geographic location, Internet Protocol (IP) address, or other information.

Step 208: After receiving the tag request message and user behavior information, the DSP server $200_3$ transmits a tag response message with pixel of the identity broker $200_4$ to the browser $200_1$ to redirect to the identity broker $200_4$. In an embodiment, the tag response message is a unique identifier request message which is sent to the identity broker $200_4$ when the user is on the webpage of the advertiser $200_2$.

Step 210: After receiving the redirect command, the browser $200_1$ redirects to the identity broker $200_4$ and transmit the unique identifier request message when the user is on the webpage of the advertiser $200_2$. In an embodiment, the DSP server $200_3$ calls an identifier entity broker service to send the unique identifier request message to the identity broker $200_4$.

Step 212: After receiving the unique identifier request message, the identity broker $200_4$ transmits a unique identifier of the user to the browser $200_1$ to redirect to the DSP server $200_3$. In an embodiment, the unique identifier is a random value generated by the identity broker $200_4$. In another embodiment, the unique identifier is generated by a cookie based implementation process. In another embodiment, the unique identifier is a fingerprint of the browser $200_1$. In another embodiment, the unique identifier is a fingerprint of the user. In another embodiment, the unique identifier is a cross identifier.

In an embodiment, in the cookie based implementation, the identity broker $200_4$ inserts a browser cookie with the unique identifier of the user from its domain on user's system. Whenever the identity broker $200_4$ receives the unique identifier request message, the identity broker $200_4$ reads the cookie and transmits back the unique identifier. If the cookie is not available, then the identity broker $200_4$ creates a new unique identifier, inserts the cookie, and returns the unique identifier to the requestor. Further, the unique identifier generated by the identity broker $200_4$ can be a random string or can be based on properties of the user or the browser $200_1$. In case of the random string, the unique identifier is lost and the new unique identifier needs to be created whenever the user deletes the cookie. For electronic devices such as mobile phones, the identity broker $200_4$ may return a hash of device identifier or a unique advertising identifier if it has access to the same.

In another embodiment, the task of the identity broker $200_4$ is to provide the unique identifier of the user. The identity broker $200_4$ generates the unique identifier as the random string, based on the properties of the user, or based on the properties of the browser $200_1$. One of the approaches to generate the unique identifier is to obtain the fingerprint of the browser $200_1$. The publisher server (not shown) and the DSP server $200_3$ agree upon the unique fingerprinting scheme. Further, when the service of the identity broker $200_4$ is required, the DSP server $200_3$ or the publisher server executes the fingerprinting scheme in the browser $200_1$ to obtain the unique identifier of the user. Unlike the cookie based implementation, with the fingerprint of the browser $200_1$, the device, or the user's electronic device can be used for creating the unique identifier which is less prone to users deleting the cookies.

In an embodiment, the DSP server $200_3$ stores the unique identifier of the user in its cookie on the browser $200_1$ thus, avoiding sending request messages to the identity broker $200_4$ in case of user visiting multiple web pages. Unlike the conventional systems and methods, the DSP server $200_3$ does not fire individual partner pixels thus, reducing the page load time and the bandwidth consumption. Also, by using the proposed method, the security of the advertiser web page is improved.

Step 214: After receiving the redirect command, the browser $200_1$ redirects an identity notification response message including the unique identifier of the user to the DSP server $200_3$. The DSP server $200_3$ creates a rule file, where the rule file including the unique identifier of the user for which at least one DSP is interested in displaying an advertisement (Ad). Further, the DSP server $200_3$ transmits the created rule book to the publisher server.

In an embodiment, the rule file defines a plurality of conditions based on which the DSP buys an advertising inventory to display the advertisement to the user. The plurality of conditions are defined based on a DSP bid value, number of impressions, publisher website information, time of the day, a day of a year, type of inventory, a variable defined by an exchange, a variable defined by the DSP, user behaviors on the advertiser webpage, or combination of same.

In an embodiment, once the DSP server $200_3$ receives the unique identifier of the user which the DSP server $200_3$ is interested, the DSP server $200_3$ notifies the publisher server about the interest in an offline server-to-server procedure. In an embodiment, the DSP server $200_3$ transmits the unique identifiers of multiple users to the publisher server for which the DSP server $200_3$ is interested in displaying the Ad. Along with the unique identifiers, the DSP server $200_3$ can transmit the CPM (per thousand impressions) it is willing to pay, number of impressions the DSP server $200_3$ need to display for the user. The server-to-server protocol may occur simultaneously (i.e., in real time) when the user visits the advertiser webpage or on a periodic manner. Similarly, the DSP server $200_3$ can transmit the unique identifier of the user to the publishers when the DSP server $200_3$ is no longer interested in displaying the Ad to the user (i.e., un-pixelling).

Step 216: After receiving the identity notification response message, the DSP server $200_3$ transmits an identity notification response "OK" message to the browser $200_1$.

Unlike the conventional systems and methods, in the proposed method, only one (or few if there are multiple identity brokers) identity broker pixel is fired instead of firing large number of partner pixels as described in the conventional methods. Furthermore, steps 210 to 216 are redundant if the identity broker $200_4$ was invoked before. Because of a cookie deletion, and since these IDs are "soft", the DSP server $200_3$ may select to invoke the identity broker $200_4$ once every few days.

Figure 3:
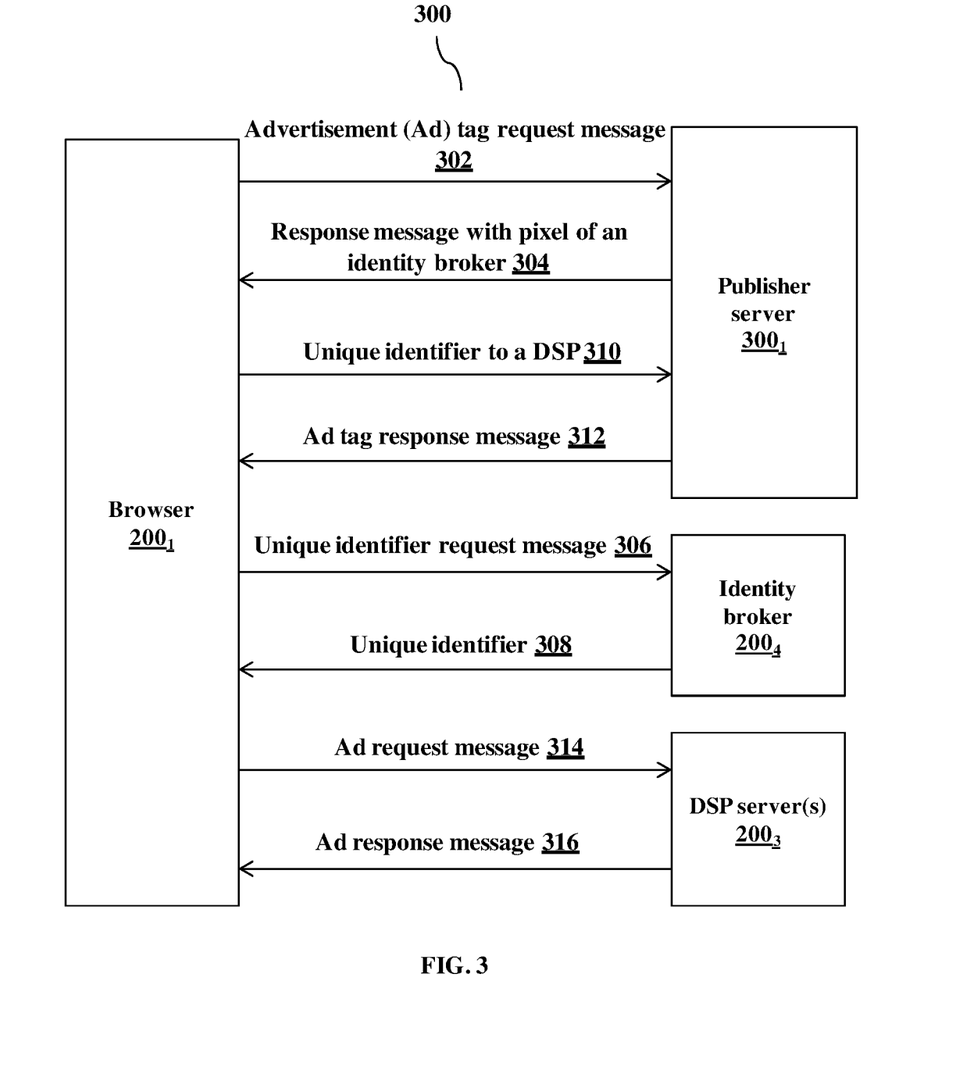
FIG. 3 illustrates a system for facilitating partner pixelling for user identification using a publisher server, according to an embodiment as disclosed herein.

FIG. 3 illustrates another system 300 for facilitating partner pixelling for user identification using the publisher server, according to an embodiment as disclosed herein. In an embodiment, the system 300 includes the browser $200_1$, the publisher server $300_1$, the identity broker $200_4$, and the DSP server $200_3$. In an embodiment, whenever the user visits the publisher web site, the publisher server $300_1$ uses the unique identifier to identity the user and the list of DSPs that are interested in displaying the Ad to the user. When the user visits the publisher web page, one of the following conditions occur i.e., (i) the publisher server $300_1$ not having the unique identifier of the user or (ii) the publisher server $300_1$ having the unique identifier of the user. As shown in the FIG. 3, in case of the publisher server $300_1$ not having unique identifier of the user, the interactions between the browser $200_1$, the publisher server $300_1$, the identity broker $200_4$, and the DSP server $200_3$ are described below:

Step 302: whenever, the user, using the browser $200_1$ transmits an Ad tag request message to the publisher server $300_1$ when the user intends to visit the web page of the publisher.

Step 304: After receiving the Ad tag request message, the publisher server $300_1$ transmits a response message that fires the pixel of the identity broker $200_4$, to receive the unique identifier, to the browser $200_1$ to redirect to the identity broker $200_4$. In an embodiment, the response message is the unique identifier request message.

Step 306: After receiving the redirect command, the browser $200_1$ transmits the unique identifier request message to the identity broker $200_4$ when the user is on the publisher web page.

Step 308: After receiving the unique identifier request message, the identity broker $200_4$ determines whether the unique identifier is available in a database based on at least one parameter. Further, the identity broker $200_4$ generates the unique identifier for the user based on the parameter when the unique identifier is unavailable in the database. After generating the unique identifier, the identity broker $200_4$ transmits the unique identifier for the user to the browser $200_1$ to redirect to the publisher server $300_1$.

Step 310: After receiving the redirect command, the browser $200_1$ redirects the unique identifier to the publisher server $300_1$. Also, the publisher server $300_1$ receives the rule file from the DSP server $200_3$, where the rule file includes the unique identifier of the user for which at least one DSP is interested in displaying the advertisement. The publisher server $300_1$ determines a match between the unique identifier received from the identity broker $200_4$ and the unique identifier in the rule file. Further, the publisher server $300_1$ selects the optimal DSP among the DSPs. In an embodiment, the optimal DSP is selected through RTB bidding. In another embodiment, the optimal DSP is selected using a suitable scheme. Further, the publisher server $300_1$ calls an Ad tag of the selected DSP to serve the advertisement.

Step 312: The publisher server $300_1$ transmits the Ad tag response message to the browser $200_1$ to redirect to the DSP server $200_3$.

Step 314: After receiving the redirect command, the browser $200_1$ transmits an Ad request message to the DSP server $200_3$.

Step 316: The DSP server $200_3$ transmits the Ad response message to the browser $200_1$ to redirect to the publisher server $300_1$ to display the Ad to the user.

In another scenario, where the publisher server $300_1$ publisher server $300_1$ having the unique identifier of the user, Steps 304 to 310 as described above are eliminated.

Figure 4:
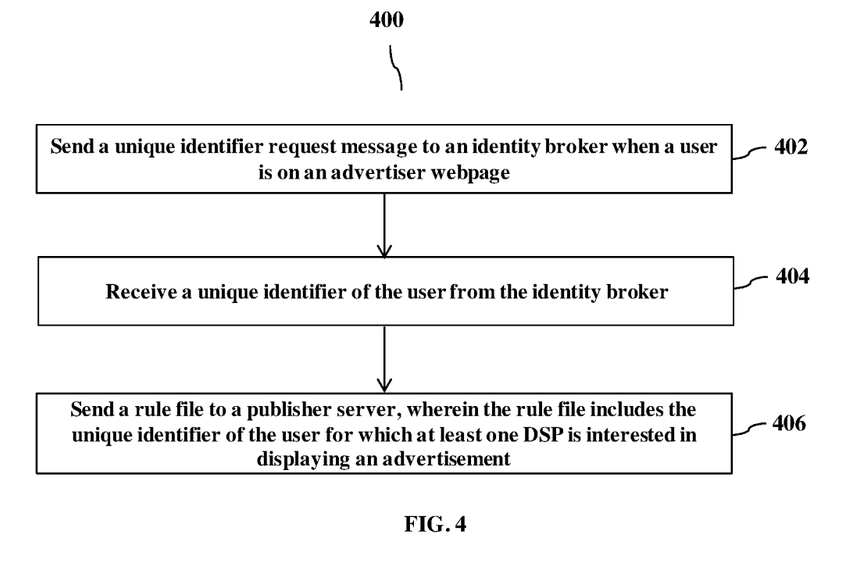
FIG. 4 is a flow diagram illustrating a method for partner pixelling for user identification using a Demand Side Platform (DSP) server, according to an embodiment as disclosed herein.

FIG. 4 is a flow diagram illustrating a method 400 for partner pixelling for user identification using the DSP server $200_3$, according to an embodiment as disclosed herein. At step 402, the method 400 includes sending the unique identifier request message to the identity broker $200_4$ when the user is on the advertiser webpage. The method 400 allows the DSP server $200_3$ to send the unique identifier request message to the identity broker $200_4$ when the user is on the advertiser webpage. In an embodiment, the DSP server $200_3$ invokes the identifier entity broker service to send the unique identifier request message to the identity broker $200_4$.

At step 404, the method 400 includes receiving the unique identifier of the user from the identity broker $200_4$. The method 400 allows the DSP server $200_3$ to receive the unique identifier of the user from the identity broker $200_4$. In an embodiment, the unique identifier is the random value generated by the identity broker $200_4$, the fingerprint of the browser $200_1$, the fingerprint of the user electronic device, and the cross identifier.

At step 406, the method 400 includes sending the rule file to the publisher server $300_1$, where the rule file includes the unique identifier of the user for which at least one of the DSP is interested in displaying the Ad. The method 400 allows the DSP server $200_3$ to send the rule file to the publisher server $300_1$, where the rule file includes the unique identifier of the user for which at least one of the DSP is interested in displaying the Ad. In an embodiment, the rule file defines the plurality of conditions based on which the DSP buys the advertising inventory to display the advertisement to the user. The plurality of conditions are defined based on the DSP bid value, number of impressions, publisher website information, time of the day, the day of the year, type of inventory, the variable defined by the exchange, the variable defined by the DSP, the user behaviors on the advertiser webpage, or combination of same.

Unlike the conventional systems, in the proposed method DSP server doesn't have to keep track of the identifiers separately for each entity. For example, consider a scenario where the advertiser (adv), 2 DSP servers (i.e., DSP-1 and DSP-2), and 4 publisher servers (i.e., Pub-1, Pub-2, Pub-3, and Pub-4) are available in the proposed system, where the unique identifier of the user "X" be "Unique_X". The mapping table in the DSP-1 is as shown below in Table-3:

TABLE 3

| DSP identifier | Unique identifier |
|---|---|
| DSP-1_X | Unique_X |

The mapping table in the Pub-1 is as shown below in Table-4. Thus, eliminating the need to store different identifiers for the same user across the DSPs and the publishers.

TABLE 4

| Publisher identifier | Unique identifier |
|---|---|
| Pub-1_X | Unique_X |

The various actions, acts, blocks, steps, or the like in the method 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
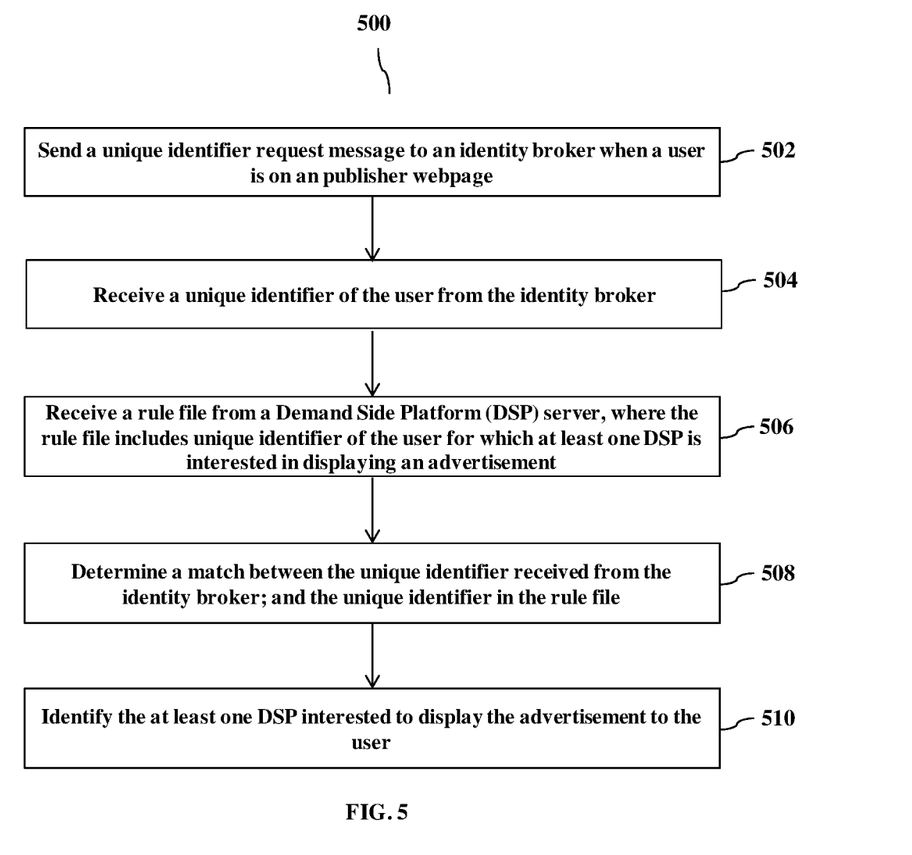
FIG. 5 is a flow diagram illustrating a method for partner pixelling for user identification using a publisher server, according to an embodiment as disclosed herein.

FIG. 5 is a flow diagram illustrating a method 500 for partner pixelling for user identification using the publisher server $300_1$, according to an embodiment as disclosed herein. At step 502, the method 500 includes sending the unique identifier request message to the identity broker $200_4$ when the user is on the publisher webpage. The method 500 allows the publisher server $300_1$ to send the unique identifier request message to the identity broker $200_4$ when the user is on the publisher webpage. In an embodiment, the unique identifier is the random value generated by the identity broker, the fingerprint of the browser $200_1$, the fingerprint of the user electronic device, and the cross identifier.

At step 504, the method 500 includes receiving the unique identifier of the user from the identity broker $200_4$. The method 500 allows the publisher server $300_1$ to receive the unique identifier of the user from the identity broker $200_4$. At step 506, the method 500 includes receiving the rule file from the DSP server $200_3$, where the rule file includes the unique identifier of the user for which the DSP is interested in displaying the Ad. The method 500 allows the publisher server $300_1$ to receive the rule file from the DSP server $200_3$, where the rule file includes the unique identifier of the user for which the DSP is interested in displaying the Ad. In an embodiment, the rule file defines the plurality of conditions based on which the DSP buys the advertising inventory to display the Ad to the user. The plurality of conditions are defined based on the DSP bid value, number of impressions, publisher website information, time of the day, the day of the year, type of inventory, the variable defined by the exchange, the variable defined by the DSP, the user behaviors on the advertiser webpage, or combination of same.

At step 508, the method 500 includes determining the match between the unique identifier received from the identity broker $200_4$; and the unique identifier in the rule file. The method 500 allows the publisher server $300_1$ to determine the match between the unique identifier received from the identity broker $200_4$; and the unique identifier in the rule file. At step 510, the method 500 includes identifying the DSP interested to display the Ad to the user in response to determining the match. The method 500 allows the publisher server $300_1$ to identify the DSP interested to display the Ad to the user in response to determining the match.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
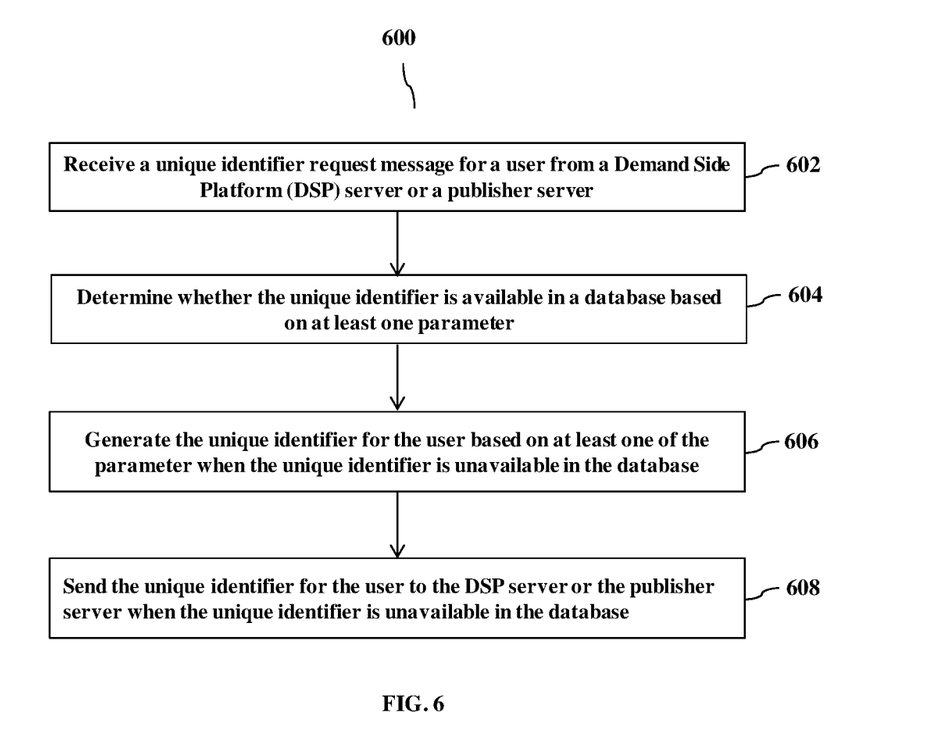
FIG. 6 is a flow diagram illustrating a method for partner pixelling for user identification using an identity broker, according to an embodiment as disclosed herein.

FIG. 6 is a flow diagram illustrating a method 600 for partner pixelling for user identification using the identity broker $200_4$, according to an embodiment as disclosed herein. At step 602, the method 600 includes receiving the unique identifier request message for the user from the DSP server $200_3$ or the publisher server $300_1$. The method 600 allows identity broker $200_4$ to receive the unique identifier request message for the user from one of the DSP server $200_3$ or the publisher server $300_1$.

At step 604, the method 600 includes determining whether the unique identifier is available in the database based the parameter. The method 600 allows the identity broker $200_4$ to determine whether the unique identifier is available in the database based on the parameter. At step 606, the method 600 includes generating the unique identifier for the user based on the parameter when the unique identifier is unavailable in the database. The method 600 allows the identity broker $200_4$ to generate the unique identifier for the user based the parameter when the unique identifier is unavailable in the database.

At step 608, the method 600 includes sending the unique identifier for the user to the DSP server $200_3$ or the publisher server $300_1$ when the unique identifier is unavailable in the database. The method 600 allows the identity broker $200_4$ to send the unique identifier for the user to the DSP server $200_3$ or the publisher server $300_1$ when the unique identifier is unavailable in the database.

In an embodiment, the identity broker $200_4$ can provide unique identifier across devices or browsers. In this case, the identity broker $200_4$ identifies the user as the same across different browsers in the same device or across different devices. The identity broker $200_4$ can use external schemes or services to perform identification or matching between the browsers. Once the identity broker $200_4$ identifies the browsers or devices are of same user, then identity broker $200_4$ assigns the same unique identifier to the browsers or devices. Further, the publisher server $300_1$ and the DSP server $200_3$ can use the service to personalize the Ads across the devices and browsers.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
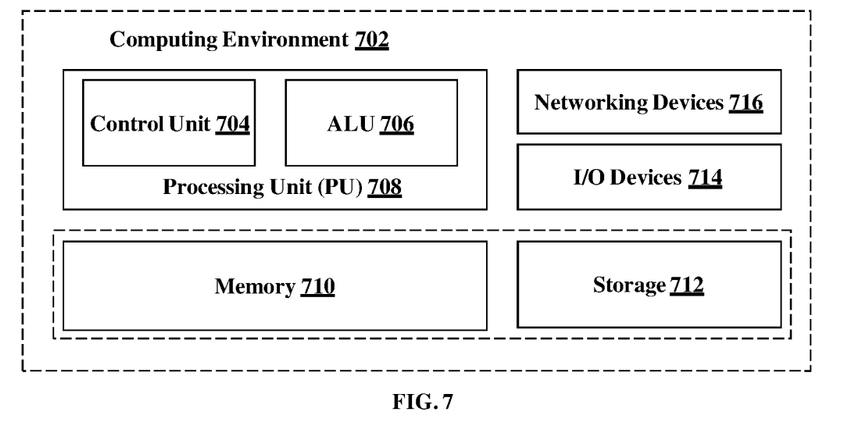
FIG. 7 illustrates a computing environment implementing the method for facilitating partner pixelling for user identification, according to an embodiment as disclosed herein.

FIG. 7 illustrates a computing environment implementing the method for facilitating partner pixelling for user identification, according to an embodiment as disclosed herein. As depicted in the figure, the computing environment 702 comprises at least one processing unit 708 that is equipped with a control unit 704 and an Arithmetic Logic Unit (ALU) 706, a memory 710, a storage unit 712, plurality of networking devices 716 and a plurality Input output (I/O) devices 714. The processing unit 708 is responsible for processing the instructions of the techniques. The processing unit 708 receives commands from the control unit 704 in order to perform its processing. Further, any logical and arithmetic operations involved in the execution of the instructions are computed with the help of the ALU 706.

The overall computing environment 702 can be composed of multiple homogeneous or heterogeneous cores, multiple CPUs of different kinds, special media and other accelerators. The processing unit 708 is responsible for processing the instructions of the technique. Further, the plurality of processing units 708 may be located on a single chip or over multiple chips.

The technique comprising of instructions and codes required for the implementation are stored in either the memory unit 710 or the storage 712 or both. At the time of execution, the instructions may be fetched from the corresponding memory 710 or storage 712, and executed by the processing unit 708.

In case of any hardware implementations various networking devices 716 or external I/O devices 714 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 2 through 7 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. A partner-pixelling user-identification system constructed to perform a computer implemented method for partner pixelling to make user identification, the method comprising:
    sending, by a Demand Side Platform (DSP) server, a unique identifier request message to an identity broker when a user is on an advertiser webpage;
    receiving, by the DSP server, a unique identifier of the user from said identity broker, wherein the unique identifier is generated based on a cookie based implementation process, and wherein in the cookie based implementation a browser cookie is inserted with the unique identifier when the browser cookie is unavailable;
    storing, by the DSP server, the unique identifier of the user in a cookie of the DSP server on a browser with which the user is visiting the advertiser webpage; and
    sending, by the DSP server, a rule file to a publisher server, wherein the rule file comprises the unique identifier of the user for which at least one DSP is interested in displaying an advertisement.

2. The computer implemented method of claim 1, wherein the rule file defines plural conditions based on which a DSP buys an advertising inventory to display the advertisement to the user.

3. The computer implemented method of claim 2, wherein the plural conditions are defined based on the group consisting of a DSP bid value, a number of impressions, publisher website information, a time of the day, a day of a year, a type of inventory, and a user behavior on the advertiser webpage.

4. The computer implemented method of claim 1, wherein the unique identifier is a random value generated by the group consisting of the identity broker, a fingerprint of a browser, a fingerprint of a user electronic device, or a cross identifier.

5. A partner-pixelling user-identification system constructed with a Demand Side Platform (DSP) server for partner pixelling to make user identification, the DSP configured to:
    send a unique identifier request message to an identity broker when a user is on an advertiser webpage;
    receive a unique identifier of said user from said identifier entity broker, wherein the unique identifier is generated based on a cookie based implementation process, wherein in the cookie based implementation a browser cookie is inserted with the unique identifier when the browser cookie is unavailable;
    store, by the DSP server, the unique identifier of the user in a cookie of the DSP server on a browser with which the user is visiting the advertiser webpage; and
    send a rule file to a publisher server, wherein said rule file comprises said unique identifier of said user for which at least one DSP is interested in displaying an advertisement.

6. The DSP of claim 5, wherein the rule file defines plural conditions based on the DSP being used to buy an advertising inventory to display the advertisement to the user.

7. The DSP of claim 6, wherein the plural conditions are defined based on the group consisting of a DSP bid value, a number of impressions, publisher website information, a time of the day, a day of a year, a type of inventory, and a user behavior on the advertiser webpage.

8. The DSP of claim 5, wherein the unique identifier is a random value generated by the group consisting of an identity broker, a fingerprint of a browser, a fingerprint of a user electronic device, and a cross identifier.

* * * * *